(12) United States Patent
Wigmore

(10) Patent No.: US 10,289,320 B1
(45) Date of Patent: May 14, 2019

(54) UTILIZING A VIRTUAL BACKUP APPLIANCE WITHIN DATA STORAGE EQUIPMENT

(71) Applicant: EMC IP Holding Company LLC, Hopkinton, MA (US)

(72) Inventor: Ian Wigmore, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 18 days.

(21) Appl. No.: 15/493,634

(22) Filed: Apr. 21, 2017

(51) Int. Cl.
*G06F 3/06* (2006.01)
*G06F 9/455* (2018.01)

(52) U.S. Cl.
CPC ............ *G06F 3/0619* (2013.01); *G06F 3/065* (2013.01); *G06F 3/067* (2013.01); *G06F 3/0665* (2013.01); *G06F 9/45558* (2013.01); *G06F 2009/45583* (2013.01)

(58) Field of Classification Search
CPC ...... G06F 3/0619; G06F 3/065; G06F 3/0665; G06F 3/067; G06F 9/45558; G06F 2009/45583
See application file for complete search history.

(56) References Cited

U.S. PATENT DOCUMENTS

| | | | |
|---|---|---|---|
| 5,742,792 A * | 4/1998 | Yanai | G06F 3/0601 710/1 |
| 9,110,599 B1 | 8/2015 | Fair | |
| 9,384,151 B1 | 7/2016 | Fair | |
| 9,390,034 B1 | 7/2016 | Fair | |
| 9,398,016 B1 | 7/2016 | Chakraborty et al. | |
| 9,772,910 B1 | 9/2017 | Wigmore et al. | |
| 9,916,203 B1 | 3/2018 | Pogde et al. | |
| 2005/0216788 A1 * | 9/2005 | Mani-Meitav | G06F 11/1456 714/6.32 |
| 2010/0306500 A1 * | 12/2010 | Mimatsu | G06F 3/0605 711/209 |
| 2015/0242283 A1 * | 8/2015 | Simoncelli | G06F 11/1456 711/162 |

OTHER PUBLICATIONS

EMC Community Network, "Introducing EMC ProtectPoint for XtremIO-Flash Optimized Data Protection", https://community.emc.com/community/products/data-domain/blog/2015/12/02/protectpoint-now-the-flash-optimized-solution-for-your-oracle-backup, Dec. 2, 2015, pp. 1-3.

* cited by examiner

*Primary Examiner* — Larry T Mackall
(74) *Attorney, Agent, or Firm* — BainwoodHuang

(57) ABSTRACT

A technique provides data storage system services in data storage equipment. The technique involves performing, by processing circuitry of the data storage equipment, data storage operations on a production volume in response to data storage commands from a set of application servers (e.g., external host computers). The production volume stores application server data utilized by the set of application servers. The technique further involves running, by the processing circuitry of the data storage equipment, an instance of a virtual backup appliance within the data storage equipment while the data storage operations are performed on the production volume in response to the data storage commands. The technique further involves generating, by the processing circuitry of the data storage equipment, backups of the production volume via the instance of the virtual backup appliance running within the data storage equipment.

18 Claims, 5 Drawing Sheets

UTILIZING A VIRTUAL BACKUP APPLIANCE WITHIN DATA STORAGE EQUIPMENT

BACKGROUND

A conventional data storage system includes a primary data storage array and a physical backup appliance. These conventional physical data storage components operate to manage host data on behalf of host computers.

During operation, the primary data storage array responds to host input/output (I/O) requests from the host computers by writing host data to and reading host data from a group of storage devices of the array. Furthermore, the physical backup appliance maintains a backup copy of the host data.

If the host data on the group of storage devices of the array is lost, the host data may be recovered via the physical backup appliance. For example, suppose that the group of storage devices suffers multiple storage device failures resulting in loss of host data. In such a situation, the backed up host data may be restored by the physical backup appliance to another group of storage devices of the array.

SUMMARY

Unfortunately, there are deficiencies to the above-described conventional data storage system that includes the primary data storage array and the physical backup appliance. For example, the primary data storage array and the physical backup appliance may separately consume significant resources such as rack space, cooling/ventilation resources, power resources, Fibre Channel (FC) switch/port capacity, and so on. This imposes a heavy burden from several perspectives such as infrastructure, cost, training to connect and operate different hardware, etc.

In contrast to the above-described conventional data storage system which requires excessive resources to support operation of both the primary data storage array and the physical backup appliance, improved techniques are directed to data storage that involves a virtual backup appliance. That is, the virtual backup appliance is integrated (or converged/embedded) into the same data storage equipment that performs data storage operations on a production volume in response to data storage commands from a set of application servers (e.g., host computers). Not only does such merging together of primary data storage functionality with backup appliance operation within the same equipment consume less resources (e.g., less rack space, cooling/ventilation resources, power resources, FC switch/port capacity, etc.), backups can be performed in parallel to complete faster (i.e., backups may simply consume excess/idle capacity of the data storage equipment rather than be bottlenecked by limitations of conventional dedicated backup appliance hardware). In some arrangements, the virtual backup appliance performs deduplication, compression, local snapshot-based backups, remote replication-based backups, management of block-based constructs (e.g., logical units of data or LUNs, volumes, etc.) as file-based objects, combinations thereof, and so on.

One embodiment is directed to a method of providing data storage system services in data storage equipment. The method includes performing, by processing circuitry of the data storage equipment, data storage operations on a production volume in response to data storage commands from a set of application servers. The production volume stores application server data utilized by the set of application servers. The method further includes running, by the processing circuitry of the data storage equipment, an instance of a virtual backup appliance within the data storage equipment while the data storage operations are performed on the production volume in response to the data storage commands. The method further includes generating, by the processing circuitry of the data storage equipment, backups of the production volume via the instance of the virtual backup appliance running within the data storage equipment.

In some arrangements, the set of application servers includes a host computer which is external to the data storage equipment. The host computer provides, as at least some of the data storage commands, block-based host input/output (I/O) requests. In these arrangements, performing the data storage operations on the production volume includes performing block-based read operations and block-based write operations on the production volume within the data storage equipment in response to the block-based host I/O requests provided by the host computer.

In some arrangements, generating the backups of the production volume includes operating the instance of the virtual backup appliance to create, as at least some of the backups, local snapshots of the production volume within the data storage equipment. Along these lines, in accordance with certain embodiments, operating the instance of the virtual backup appliance to create the local snapshots may involve locating a full backup and a series of incremental backups within a set of files stored within an array of storage devices of the data storage equipment. In these embodiments, the data storage operations that are performed on the production volume are block-based, and the virtual backup appliance receives blocks but stores them internally as files.

In some arrangements, operating the instance of the virtual backup appliance includes operating a hypervisor within the data storage equipment, and directing the hypervisor to run the instance of the virtual backup appliance. It should be understood that the hypervisor may run multiple instances of the virtual backup appliance and backups may be performed faster in parallel. Along these lines, the virtual backup appliance may be spun up (or instantiated) on demand.

In some arrangements, running the instance of the virtual backup appliance within the data storage equipment includes operating a reverse cut-through driver disposed between a snapshot layer of the data storage equipment and the virtual backup appliance. In these arrangements, the snapshot layer is constructed and arranged to identify data blocks for snapshots, and the reverse cut-through driver is constructed and arranged to provide a message passing interface between the snapshot layer and the virtual backup appliance.

In some arrangements, the method further includes replicating the full backup and the series of incremental backups from the data storage equipment to a remote data storage system that is external to the data storage equipment. Such geographical separation provides protection against full site failures.

Another embodiment is directed to data storage equipment that includes a communications interface constructed and arranged to communicate with a set of application servers, memory, and control circuitry coupled to the communications interface and the memory. The memory stores instructions which, when carried out by the control circuitry, cause the control circuitry to:

(A) perform data storage operations on a production volume in response to data storage commands from the set of application servers, the production volume storing application server data utilized by the set of application servers, (B) run an instance of a virtual backup appliance within the data storage equipment while the data storage operations are performed on the production volume in response to the data storage commands, and (C) generate backups of the production volume via the instance of the virtual backup appliance running within the data storage equipment.

Yet another embodiment is directed to a computer program product having a non-transitory computer readable medium which stores a set of instructions to provide data storage system services. The set of instructions, when carried out by data storage equipment, causing the data storage equipment to perform a method of:

(A) performing data storage operations on a production volume in response to data storage commands from a set of application servers, the production volume storing application server data utilized by the set of application servers;

(B) running an instance of a virtual backup appliance within the data storage equipment while the data storage operations are performed on the production volume in response to the data storage commands; and (C) generating backups of the production volume via the instance of the virtual backup appliance running within the data storage equipment.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in utilizing a virtual backup appliance within data storage equipment.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to data storage involving use of a virtual backup appliance. In particular, the virtual backup appliance is embedded (or converged) into the same data storage equipment that performs data storage operations on a production volume in response to data storage commands from a set of application servers (e.g., external host computers). Not only does such co-location of primary data storage functionality and backup appliance operation within the same electronic equipment consume less resources (e.g., less rack space, cooling/ventilation, power resources, Fibre Channel or FC ports, etc.), multiple backups can be performed in parallel for faster completion (e.g., by leveraging idle processing capacity during times of lower data storage activity). In some arrangements, the virtual backup appliance performs deduplication, compression, local snapshot-based backups, remote replication-based backups, management of block-based constructs (e.g., logical units of data or LUNs, volumes, etc.) as file-based objects, combinations thereof, etc.

Figure 1:
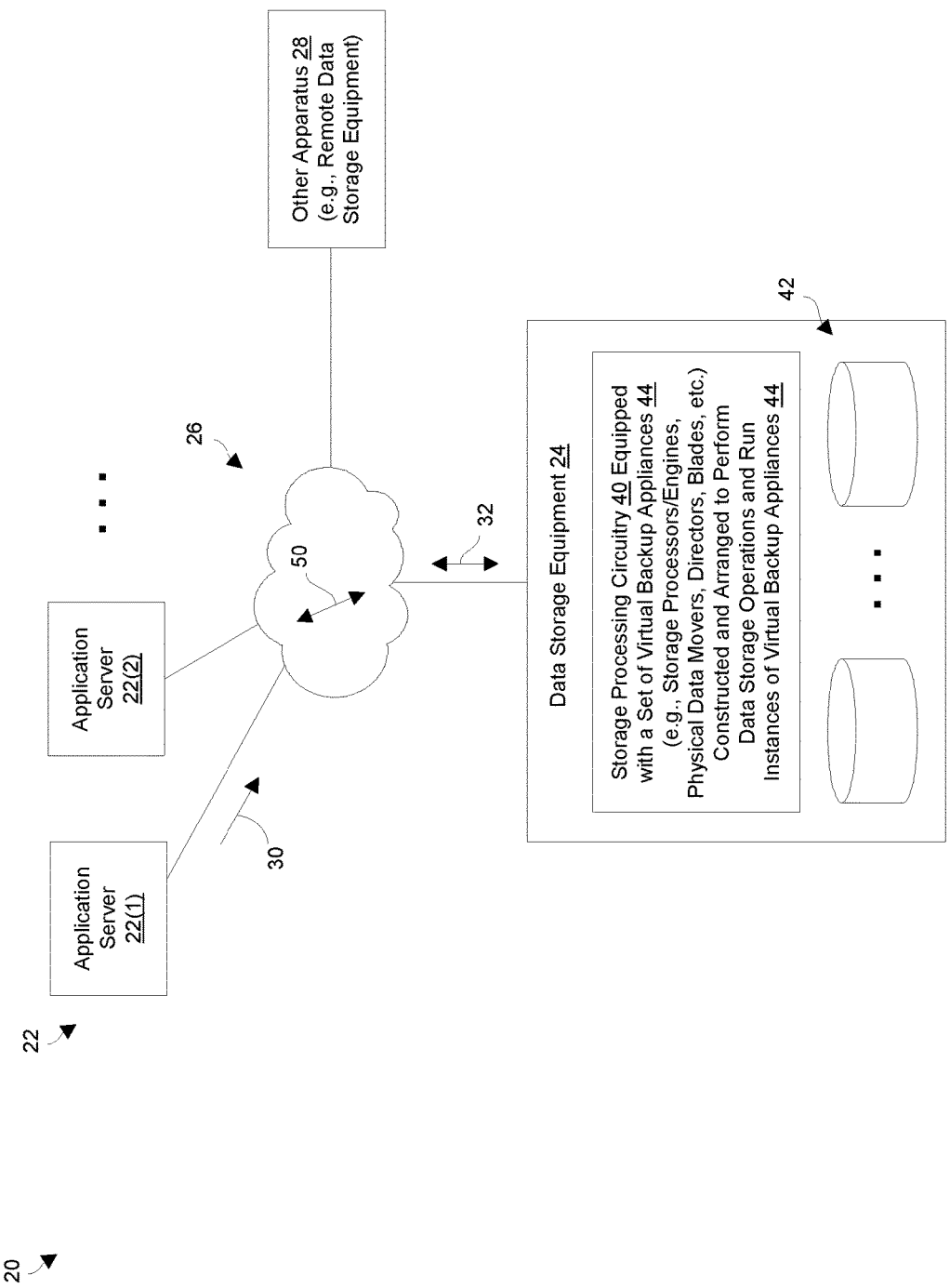
FIG. 1 is a block diagram of a data storage environment which utilizes a virtual backup appliance.

FIG. 1 shows a data storage environment 20 which utilizes a virtual backup appliance. The data storage environment 20 includes application servers 22(1), 22(2), . . . (collectively, application servers 22), data storage equipment 24, a communications medium 26, and other apparatus 28 such as remote data storage equipment.

Each application server 22 is constructed and arranged to perform useful work. For example, an application server 22 may operate as a web server, a file server, an email server, an enterprise server, combinations thereof, and so on, which provides input/output (I/O) requests 30 (e.g., small computer system interface or SCSI commands) to the data storage equipment 24 to store application server data 32 in and read application server data 32 from the data storage equipment 24.

The data storage equipment 24 includes storage processing circuitry 40 and an array of storage devices 42. The storage processing circuitry 40 may include one or more physical storage processors or engines, data movers, director boards, blades, I/O modules, storage drive controllers, switches, other hardware, combinations thereof, and so on. The storage processing circuitry 40 is constructed and arranged to provide a variety of data storage system services. For example, the storage processing circuitry 40 processes the I/O requests 30 from the application servers 22 by robustly and reliably storing application server data 32 in the array of storage devices 42 and retrieving the application server data 32 from the array of storage devices 42. Additionally, as will be explained in further detail shortly, the storage processing circuitry 40 runs a set of virtual backup appliances 44 (e.g., one or more instances of a virtual backup appliance 44) to obtain further data storage system services similar to those that could be obtained from a physical backup appliance (e.g., data deduplication, data compression, file-based management of storage objects, etc.). Such equipment provides fast, direct backups to deduplicated/compressed volumes which are self-contained with the same data storage frame.

The communications medium 26 is constructed and arranged to connect the various components of the data storage environment 20 together to enable these components to communicate via exchanging electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, fabric, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting SAN-based communications, LAN-based communications, cellular communications, WAN-based communications, distributed infrastructure communications, other topologies, combinations thereof, etc.

The other apparatus 28 represents one or more other electronic assemblies that connect to the communications medium 26. Along these lines, the other apparatus 28 may include remote data storage equipment for further fault tolerance (e.g., replicated data in the event of a complete site failure).

During operation, the storage processing circuitry 40 of the data storage equipment 24 writes application server data 32 to the array of storage devices 42 and reads application server data 32 from the array of storage devices 42 in response to the I/O requests 30. Additionally, the storage processing circuitry 40 operates an instance of a virtual backup appliance 44 to routinely backup the application server data 32. In particular, the array of storage devices 42 stores the application server data 32 in a production volume on one set of storage devices 42, and a backup copy of the application server data 32 (e.g., an initial full backup and a series of subsequent incremental backups) on another set of storage devices 42 residing in separate fault and power domains. Furthermore, the backed up application server data 32 may undergo deduplication, compression, etc. in a manner similar to data that is handled by a physical backup appliance.

However, since the virtual backup appliance 44 runs within the storage processing circuitry 40 of the data storage equipment 24, there are no additional support resources required. That is, unlike a conventional physical backup appliance which requires separate physical space, cooling, power access, Fibre Channel switch capacity, etc.), the virtual backup appliance simply leverages off of unused capacity of the storage processing circuitry 40 (e.g., idle processing time during period of low data storage activity). Accordingly, there is no need for backup appliance controllers and media servers, no need to pre-size and over-provision backup capacity, and so on. Further details will now be provided with reference to FIG. 2.

Figure 2:
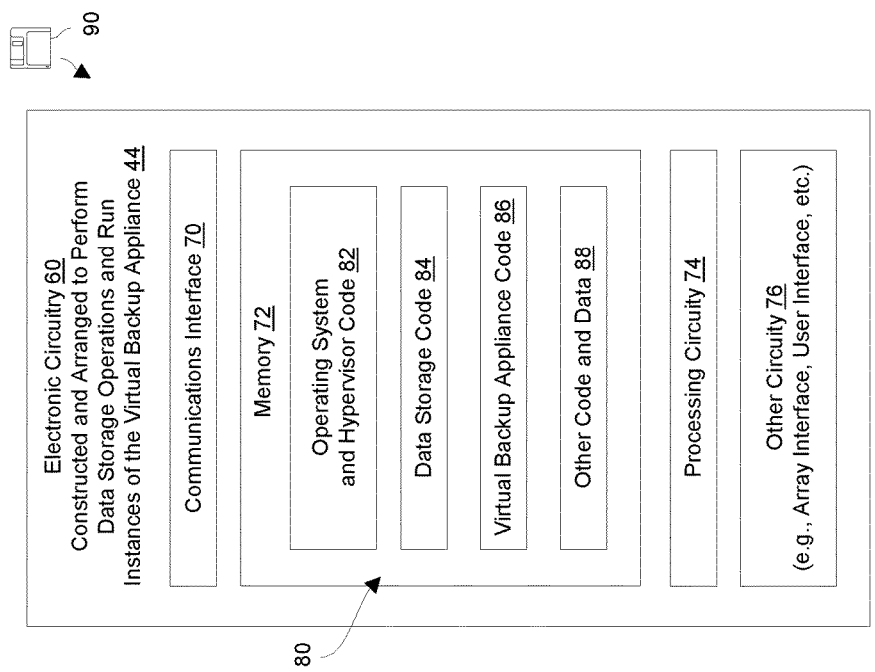
FIG. 2 is a block diagram of data storage equipment of the data storage environment of FIG. 1.

FIG. 2 shows particular details of electronic circuitry 60 which forms the "converged" storage processing circuitry 40 of the data storage equipment 24 (also see FIG. 1) in accordance with certain embodiments. As shown, the electronic circuitry 60 includes a communications interface 70, memory 72, and processing circuitry 74, and other circuitry 76.

The communications interface 70 is constructed and arranged to connect the data storage equipment 24 to the communications medium 26 (also see FIG. 1) to enable electronic communications with other devices of the data storage environment 20 (e.g., the application servers 22). Such communications may be SAN-based, IP-based, cellular-based, cable-based, fiber-optic based, wireless, cloud-based, combinations thereof, and so on. Accordingly, the communications interface 70 enables the data storage equipment 24 to robustly and reliably communicate with other external apparatus.

The memory 72 is intended to represent both volatile storage (e.g., DRAM, SRAM, etc.) and non-volatile storage (e.g., flash memory, magnetic memory, etc.). In some arrangements, the memory 72 utilizes a portion of the array of storage devices 42 (FIG. 1). The memory 72 stores a variety of software constructs 80 including operating system and hypervisor code 82, data storage code 84, and virtual backup appliance code 86, as well as other code and data 88.

The operating system and hypervisor code 82 refers to an operating system and a hypervisor which are involved in controlling various electronic resources of the data storage equipment 24 (e.g., processor cycles, memory space, a virtualized environment, etc.). In some arrangements, the hypervisor is part of the operating system (e.g., a "Type 1" hypervisor). In other arrangements, the hypervisor is separate from the operating system (e.g., a "Type 2" hypervisor).

The data storage code 84 refers to the instructions that are involved in routine data storage operations (e.g., write and read operations). The data storage code 84 may include operating parameters, drivers, other metadata, etc. that form one or more portions of the I/O stack, mapping tables, and so on.

The virtual backup appliance code 86 refers to specialized instructions that form one or more instances of the virtual backup appliance 44. Such instructions may include an image for a virtual machine (VM) or virtual components, a set of applications that run within the VM, other virtualized resources/devices, combinations thereof, etc.

The other code and data 88 refers to various other instructions, parameters, data, etc. such as that for background services (e.g., replication, Symmetrix Remote Data Facility solutions, etc.), other tools and utilities, user-level applications, and so on.

As will be explained in further detail shortly, the data storage code 84 and the virtual backup appliance code 86 operate to concurrently carry out data storage operations as well as perform local backup operations. In some embodiments, the data storage code 84 and the virtual backup appliance code 86 include specialized code, namely a reverse cut-through driver, that enables the virtual backup appliance 44 to backup the application server data 32 (e.g., create snapshots, perform deduplication, compression, etc.) while the storage processing circuitry 40 performs routine write and read operations in response to the I/O requests 30. Accordingly, with both data storage and backup services "converged" within the same electronic circuitry 60, there is less consumed power, cooling, floor/rack space, switching ports, cabling, etc. compared to that consumed by a conventional data storage system that includes a primary data storage array and a separate physical backup appliance in both production and remote sites.

The processing circuitry 74 is constructed and arranged to operate in accordance with the various software constructs 80 stored in the memory 72. As will be explained in further detail shortly, the processing circuitry 74 executes code of the various software constructs 80 to form specialized circuitry that responds to I/O requests 30 (e.g., read and write commands), as well as instantiates and operates the virtual backup appliance 44. Such processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, flash memory, disk memory, tape memory, and the like.

The other circuitry 76 represents additional hardware. For example, the other circuitry 76 may include a storage drive or array interface to communicate with the storage drives 42 (e.g., SATA, SAS, PCIe, etc.). As another example, the other circuitry 76 may include a user terminal or service processor that enables a human user to control and/or configure the data storage equipment 24, and so on. Further details will now be provided with reference to FIGS. 3 and 4.

Figure 3:
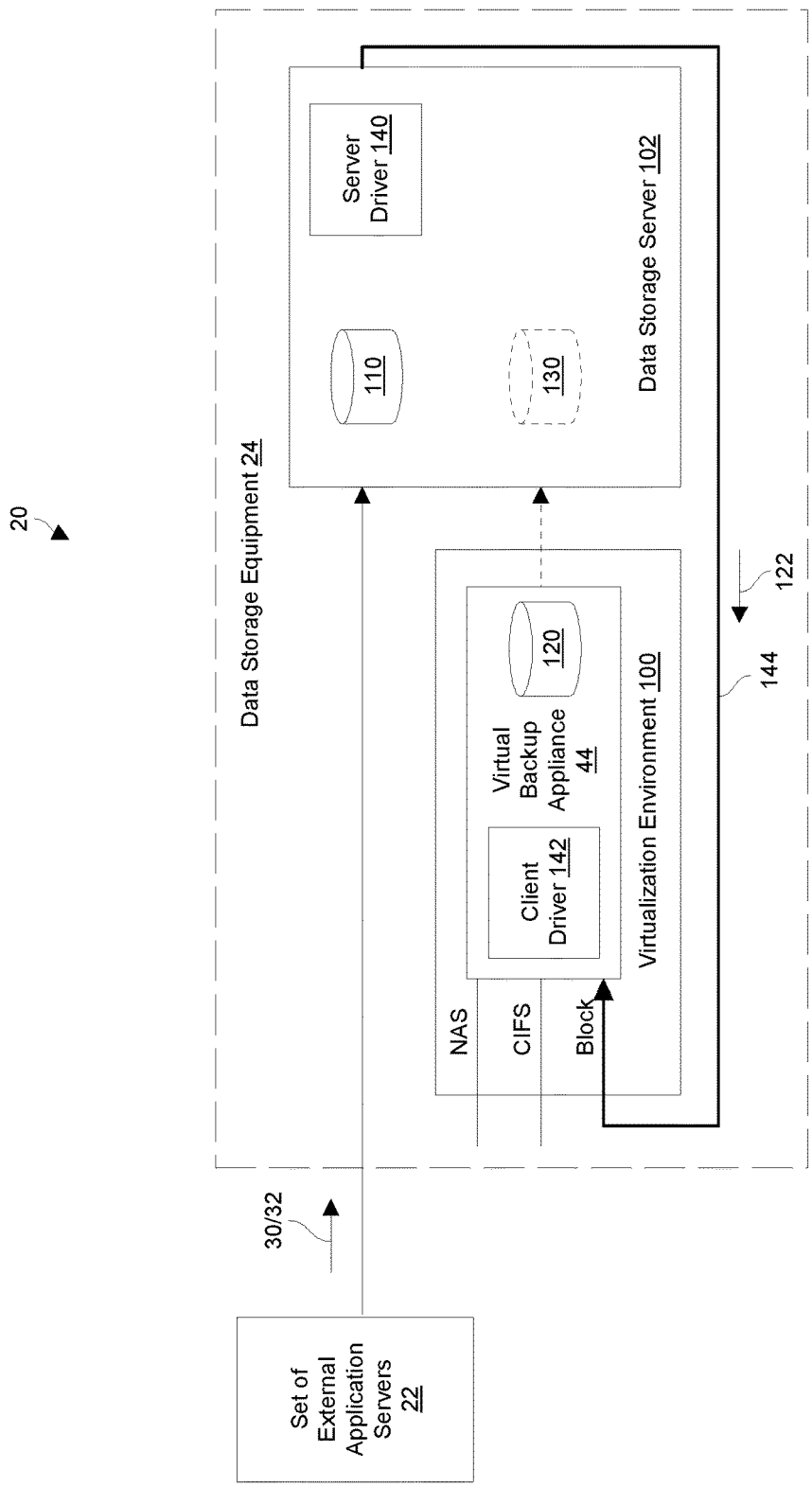
FIG. 3 is a block diagram illustrating particular details of the virtual backup appliance with respect to local backups.
Figure 4:
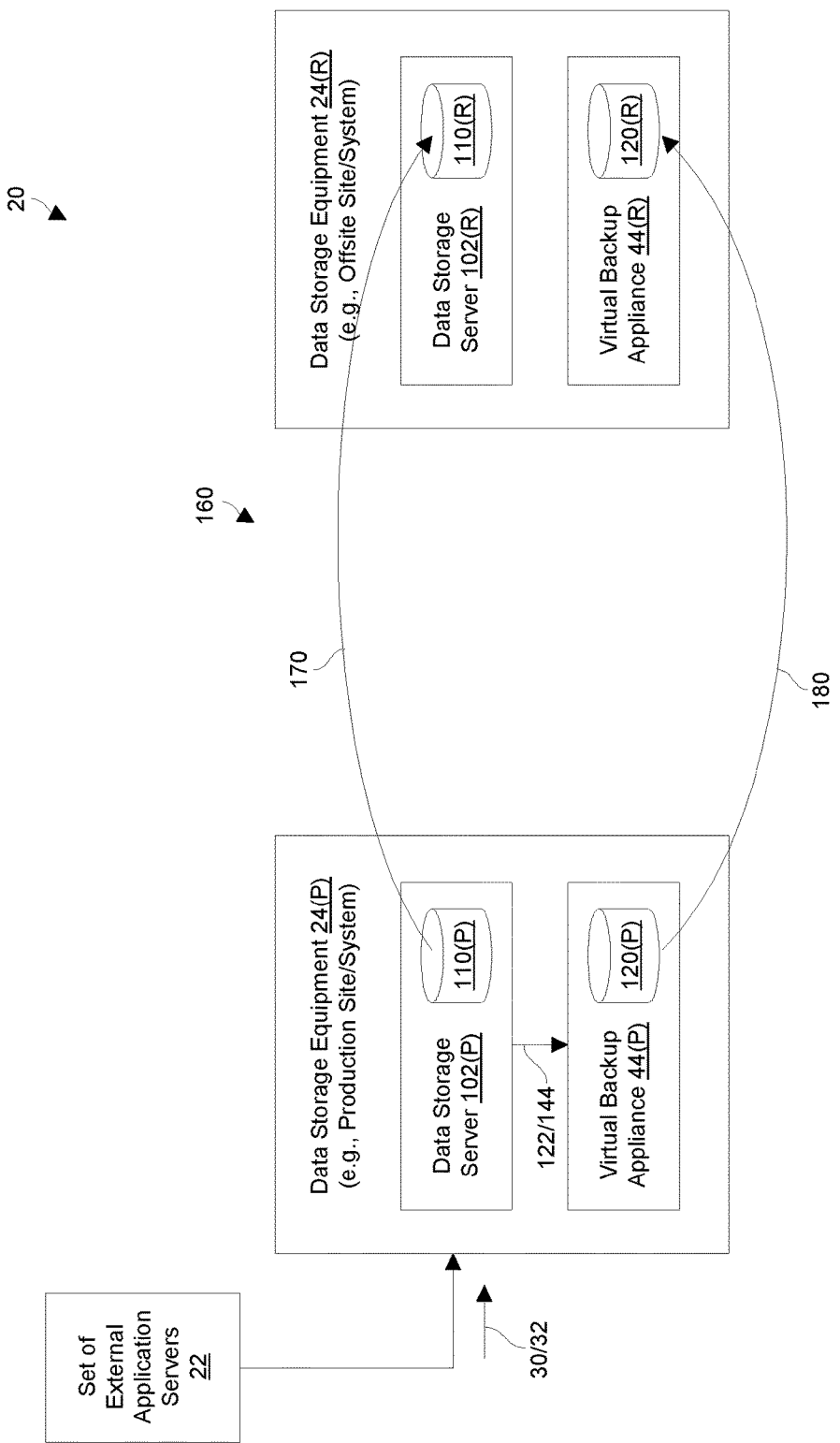
FIG. 4 is a block diagram illustrating particular details of the virtual backup appliance with respect to remote backups.

FIGS. 3 and 4 show, in accordance with certain embodiments, particular details of the data storage equipment 24 while the data storage equipment 24 concurrently provides data storage services and enhanced backup services to a set of external application servers 22 (i.e., one or more application servers 22) in a converged manner (i.e., the backup services are provided by an embedded virtual backup appliance 44). FIG. 3 shows particular details with respect to local backups. FIG. 4 shows particular details with respect to local and remote backups.

As shown in FIG. 3, the data storage equipment 24 includes a virtualization environment 100 and a data storage server 102 which are co-located within the same electronic equipment (e.g., within the same rack space, within the same electronic cabinet, etc.). In accordance with the particular embodiments of FIGS. 3 and 4, the virtualization environment 100 is formed by the earlier-mentioned processing circuitry 74 running certain specialized software constructs 80 such as a hypervisor and a VM (also see FIG. 2) to instantiate the virtual backup appliance 44. Likewise, the data storage server 102 is formed by the processing circuitry 74 running certain specialized software constructs 80 such as the data storage code 84 (FIG. 2).

As further shown in FIG. 3, the virtual backup appliance 44 and the data storage server 102 are arranged in a pipelined configuration where the data storage server 102 receives and processes I/O requests 30 from the set of application servers 22. To this end, the data storage server 102 maintains, within the array of storage devices 42, a production volume 110 that holds the application server data 32 (also see FIG. 1).

During such operation, the virtual backup appliance 44 routinely backs up (or maintains one or more copies of) the production volume 110. To this end, the virtual backup appliance 44 creates and maintains a backup volume 120 based on communications (e.g., messages) 122 from the data storage server 102. Such backup operations may be performed in response to events such as a periodic timer/scheduler, user commands, combinations thereof, and so on. By way of example only, the virtual backup appliance 44 is shown as being compatible with both block-based data as well as file-based data (e.g., network attached storage and common internet file system protocols, etc.).

In some arrangements, the virtual backup appliance 44 performs an initial full backup followed by subsequent incremental backups to maintain the backup volume 120. In some arrangements, the virtual backup appliance 44 treats the backups as snapshots thus allowing a human user (e.g., an administrator of the data storage equipment 24) to "rollback" transactions (e.g., to undo write operations) incrementally to previous snapshots and thus access prior versions of the backup volume 120 upon command. Such operation may be performed as an agent-less block-level incremental forever snapshot process to provide rapid application-consistent data capture.

With the virtual backup appliance 44 maintaining the backup volume 120, the user is able to perform data restoration operations (illustrated in FIG. 3 in phantom). Along these lines, the user is able to create a new production volume 130 on the data storage server 102 from the backup volume 120. Such operation may be performed if the original production volume 110 succumbs to a significant data loss event such as failure of multiple storage devices 42.

In some arrangements, an "instant restore" may be performed by mounting the backup volume 120 as protected data to the application server 22. Here, fast copy services of the virtual backup appliance 44 may be employed to fast copy snapshot data from previous incremental backups.

In particular embodiments, the data storage server 102 performs Federated Tiered Storage (FTS) encapsulation. In particular, the production volume 110 is preserved on the backup volume 120 and made accessible as an encapsulated device. That is, the encapsulation process configures the backup volume 120 as an "eDisk"-style external logical unit of storage (LUN), but preserves any data that exists on it. Moreover, the data storage server 102 creates an associated volume 130 through which to access to the data on the backup volume 120. In such a situation, the backup volume 120 may be isolated from the production volume 110 via SRP (Symmetrix Resource Pools) or RAID group isolation to provide isolation in separate fault and power domains.

At this point, it should be appreciated that, in accordance with certain embodiments, the pipelined configuration of the data storage server 102 and the virtual backup appliance 44 may utilize a set of drivers. To this end, the data storage server 102 includes a server driver 140 which operates to output data storage messages 122 based on data storage operations performed by the data storage server 102. Furthermore, the virtual backup appliance 44 includes a client driver 142 to receive the data storage messages 122 from the data storage server 102.

From some perspectives, the server driver 140 and the client driver 142 forms a message passing interface having a reverse cut-through driver (RCTD) configuration. That is, the server driver 140 is essentially a driver at the backend of the server driver 140 that outputs updates that are performed on the production volume 110. Since the backup work performed by the virtual backup appliance 44 is on the back-end with data-at-rest, the backup work does not interfere with the front-end I/O performance path (i.e., the backup work does not directly impact front-end performance).

Furthermore, the client driver 142 is essentially a driver at the front-end of the virtual backup appliance 44 to receive updates, and the cut-through pathway 144 for the messages 122 (shown in bold) is in the reverse direction of a flow in which an appliance might receive storage commands to store data, perform deduplication and compression on the data, and then store the data on a storage array. Further details will now be provided with reference to FIG. 4.

FIG. 4 shows particular details with respect to local and remote backups. Here, the data storage environment 20 includes data storage equipment 24(P) and other data storage equipment 24(R) which is offsite relative to the data storage equipment 24(P). At least initially, the data storage equipment 24(P) operates as a production site or system while the data storage equipment 24(R) operates as a replica site or system.

It should be understood that the data storage equipment 24(P) includes a data storage server 102(P) and a virtual backup appliance 44(P). The particular details of the data storage equipment 24(P) have been simplified so that focus is placed on the relationship between data storage equipment 24(P) and other data storage equipment 24(R). Nevertheless, the internal details of the data storage equipment 24(P) may resemble those of the earlier-described data storage equipment 24 (e.g., also see FIG. 3). Accordingly, the data storage server 102(P) maintains a production volume 110(P), and the embedded virtual backup appliance 44(P) maintains a backup volume 120(P) based on communications 122 through a message passing interface 144 (e.g., an RCTD arrangement) extending between the data storage server 102(P) and the virtual backup appliance 44(P).

For further fault tolerance, a copy of the backup volume 120(P) may be maintained by the other data storage equipment 24(R) (e.g., also see the other apparatus 28 of FIG. 1). To this end, communications 160 are exchanged between the data storage equipment 24(P) and other data storage equipment 24(R). In some arrangements, the data storage equipment 24(P) and other data storage equipment 24(R) are able to coordinate their operation so that a complete failure of the data storage equipment 24(P) results in failover to the other data storage equipment 24(R) (e.g., where the other data storage equipment 24(R) then operates as a new production site/system).

As shown in FIG. 4, there are different replication alternatives that can be employed for the other data storage equipment 24(R) to maintain one or more copies of the application server data 32. Other offsite backup alternatives are suitable for use as well.

In some embodiments, a server replication session 170 is created between the data storage server 102(P) of the data storage equipment 24(P) and a data storage server 102(R) of the other data storage equipment 24(R) to maintain an offsite volume 110(R) which is a replica of the production volume 110(P). Such a server replication session 170 may operate in accordance with the SRDF (Symmetrix Remote Data Facility) protocol in either a synchronous mode and/or an asynchronous mode.

In other embodiments, a backup appliance replication session 180 is created between the virtual backup appliance 44(P) of the data storage equipment 24(P) and a virtual backup appliance 44(R) of the other data storage equipment 24(R) to maintain an offsite backup volume 120(R) which is a replica of the production backup volume 120(P). Here, the data that is copied from the virtual backup appliance 44(P) to other virtual backup appliance 44(R) may have been preprocessed (e.g., via deduplication, compression, etc.) by the virtual backup appliance 44(P) prior to transfer thus improving link efficiency.

It should be understood that other alternatives are available as well. For example, the production backup volume 120(P) may be replicated to an offsite backup volume 120(R) on a physical backup appliance. As yet another example, the production backup volume 120(P) may be replicated via a replication session (e.g., via the SRDF protocol) to the other data storage server 102(R), and so on. Further details will now be provided with reference to FIG. 5.

Figure 5:
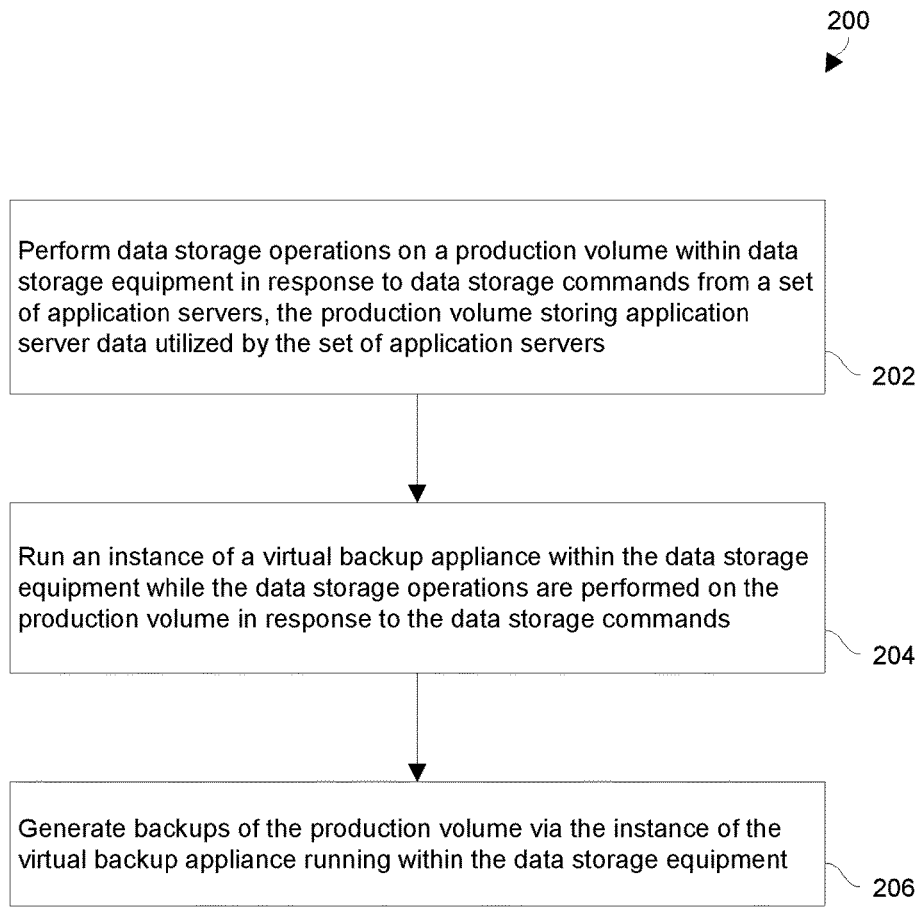
FIG. 5 is a flowchart of a procedure which is performed by the data storage environment of FIG. 1.

FIG. 5 is a flowchart of a procedure 200 which is performed by circuitry of the data storage environment 20 when providing data storage system services to a set of application servers 22. Such a procedure 200 involves use of a virtual backup appliance 44 which is integrated into the same data storage equipment 24 that performs data storage operations (e.g., reads and writes) on behalf of the set of application servers 22 (also see FIG. 1).

At 202, circuitry of the data storage equipment 24 (FIG. 1) performs data storage operations on a production volume in response to data storage commands from a set of application servers. The production volume stores application server data utilized by the set of application servers.

At 204, the circuitry of the data storage equipment 24 runs an instance of a virtual backup appliance within the data storage equipment while the data storage operations are performed on the production volume in response to the data storage commands. In some arrangements, the data storage equipment 24 runs a hypervisor and the instance of the virtual backup appliance is a VM running within the hypervisor. In other arrangements, the instance of the virtual backup appliance is a specialized application running within a VM.

At 206, the circuitry of the data storage equipment 24 generates backups of the production volume (e.g., snapshots) via the instance of the virtual backup appliance running within the data storage equipment (also see FIG. 3). Concurrently, a copy of the application server data may be placed on remote data storage equipment, e.g., via replication (also see FIG. 4).

With such backup features in place, the application servers 22 are able to enjoy high availability of the application server data 32. Moreover, there is less infrastructure required to support local data storage and backups vis-à-vis a conventional install that includes both a conventional data storage array and a separate physical backup appliance.

As described above, improved techniques are directed to data storage that involves a virtual backup appliance 44. That is, the virtual backup appliance 44 is converged into the same data storage equipment that performs data storage operations on a production volume 110 in response to data storage commands from a set of application servers 22 (e.g., host computers). Not only does such merging together of primary data storage functionality with backup appliance operation within the same equipment consume less resources (e.g., less rack space, cooling/ventilation resources, power resources, FC switch/port capacity, etc.), backups can be performed in parallel and completed faster (i.e., backups may simply consume excess capacity of the data storage equipment 24 rather than be bottlenecked by limitations of conventional dedicated backup appliance hardware). In some arrangements, the virtual backup appliance 44 performs deduplication, compression, local snapshot-based backups, remote replication-based backups, management of block-based constructs (e.g., LUNs, volumes, etc.) as file-based objects, combinations thereof, and so on.

One should appreciate that the above-described techniques do not merely store data in an abstract sense. Rather, the disclosed techniques involve an improvement to the technology by alleviating the need for customers to purchase additional physical backup appliances. Furthermore, there is no need for excessive infrastructure resources to support physical backup appliances (e.g., cooling, rack space, power, etc.). Rather, one or more virtual backup appliances 44 may be pre-configured or 'spun-up' on demand during periods of low data storage or data storage idle periods. Moreover, such features eliminate the need to pre-size and overprovision backup capacity but instead can be worked into a pay-as-you consume model.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the application server 22 and the other apparatus 26 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, the application servers 22 were described above by way of example as residing as separate devices within the data storage environment 20. Each application server 22 may take the form of a separate host computer, co-reside within one or more other application servers 22 on the same equipment, reside in the cloud, reside within the same data storage equipment 24 itself, reside in combinations thereof, and so on.

Furthermore, it should be understood that, in some embodiments, there are multiple levels of snapshots that are created. In these embodiments, one set of block-based snapshots is created by the data storage server 102, and another set of snapshots stored within files is created by the virtual backup appliance 44.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. In data storage equipment, a method of providing data storage system services, the method comprising:
    performing, by processing circuitry of the data storage equipment, data storage operations on a production volume in response to data storage commands from a set of application servers, the production volume storing application server data utilized by the set of application servers;
    running, by the processing circuitry of the data storage equipment, an instance of a virtual backup appliance within the data storage equipment while the data storage operations are performed on the production volume in response to the data storage commands; and
    generating, by the processing circuitry of the data storage equipment, backups of the production volume via the instance of the virtual backup appliance running within the data storage equipment;
    wherein the set of application servers includes a host computer which is external to the data storage equipment, the host computer providing, as at least some of the data storage commands, block-based host input/output (I/O) requests; and
    wherein performing the data storage operations on the production volume includes:
        while a backup of the production volume is being generated by the instance of the virtual backup appliance running within the data storage equipment, performing block-based read operations and block-based write operations on the production volume within the data storage equipment in response to the block-based host I/O requests provided by the host computer.

2. A method as in claim 1 wherein generating the backups of the production volume includes:
    operating the instance of the virtual backup appliance to create, as at least some of the backups, local snapshots of the production volume within the data storage equipment.

3. A method as in claim 2 wherein the data storage equipment includes an array of storage devices; and
    wherein operating the instance of the virtual backup appliance to create the local snapshots includes:
        locating a full backup and a series of incremental backups within a set of files stored within the array of storage devices.

4. A method as in claim 2, further comprising:
    after the local snapshots of the production volume are created, performing a restore operation that restores at least some of the application server data utilized by the set of application servers from the local snapshots.

5. A method as in claim 2 wherein operating the instance of the virtual backup appliance includes:
    operating a hypervisor within the data storage equipment, and
    directing the hypervisor to run the instance of the virtual backup appliance.

6. A method as in claim 2 wherein running the instance of the virtual backup appliance within the data storage equipment includes:
    operating a reverse cut-through driver disposed between a snapshot layer of the data storage equipment and the virtual backup appliance, the snapshot layer being constructed and arranged to identify data blocks for snapshots, and the reverse cut-through driver being constructed and arranged to provide a message passing interface between the snapshot layer and the virtual backup appliance.

7. A method as in claim 2, further comprising:
    replicating the full backup and the series of incremental backups from the data storage equipment to a remote data storage system that is external to the data storage equipment.

8. A method as in claim 7 wherein the remote data storage system is constructed and arranged to perform data storage operations in response to data storage commands; and
    wherein replicating the full backup and the series of incremental backups from the data storage equipment to the remote data storage system includes forming a replication session from the data storage equipment to the remote data storage system, the replication session replicating data from the full backup and the series of incremental backups to a remote volume stored within a data storage array of the remote data storage system.

9. A method as in claim 7 wherein the remote data storage system is constructed and arranged to perform data storage operations in response to data storage commands; and wherein replicating the full backup and the series of incremental backups from the data storage equipment to the remote data storage system includes forming a replication session from the data storage equipment to the remote data storage system, the replication session replicating data from the full backup and the series of incremental backups to another virtual backup appliance that runs on the remote data storage system.

10. A method as in claim 7, further comprising:
after replicating the full backup and the series of incremental backups from the data storage equipment to the remote data storage system, performing a restore operation that restores at least some of the application server data utilized by the set of application servers from the full backup and the series of incremental backups that were replicated to the remote data storage system.

11. A method as in claim 2, further comprising:
performing, by the processing circuitry of the data storage equipment, other data storage operations on another production volume in response to other data storage commands from the set of application servers, the other production volume storing other application server data utilized by the set of application servers;
running, by the processing circuitry of the data storage equipment, another instance of the virtual backup appliance within the data storage equipment while the other data storage operations are performed on the other production volume in response to the other data storage commands; and
generating, by the processing circuitry of the data storage equipment, other backups of the other production volume via the other instance of the other virtual backup appliance running within the data storage equipment, the other backups of the other production volume being generated in parallel with generating the backups of the production volume via the instance of the virtual backup appliance.

12. A method as in claim 1 wherein generating the backups of the production volume via the instance of the virtual backup appliance includes:
while a data storage server performs the data storage operations on the production volume to read application server data from the production volume and write application server data to the production volume in response to the data storage commands from the set of application servers, concurrently conveying data storage messages containing application server data updates from the data storage server to the virtual backup appliance to maintain a local backup volume that stores an instant-restore copy of the application server data.

13. Data storage equipment, comprising:
a communications interface constructed and arranged to communicate with a set of application servers;
memory; and
control circuitry coupled to the communications interface and the memory, the memory storing instructions which, when carried out by the control circuitry, cause the control circuitry to:
perform data storage operations on a production volume in response to data storage commands from the set of application servers, the production volume storing application server data utilized by the set of application servers,
run an instance of a virtual backup appliance within the data storage equipment while the data storage operations are performed on the production volume in response to the data storage commands, and
generate backups of the production volume via the instance of the virtual backup appliance running within the data storage equipment;
wherein the set of application servers includes a host computer which is external to the data storage equipment, the host computer providing, as at least some of the data storage commands, block-based host input/output (I/O) requests; and
wherein the control circuitry, when performing the data storage operations on the production volume, is constructed and arranged to:
while a backup of the production volume is being generated by the instance of the virtual backup appliance running within the data storage equipment, perform block-based read operations and block-based write operations on the production volume within the data storage equipment in response to the block-based host I/O requests provided by the host computer.

14. Data storage equipment in claim 13 wherein generating the backups of the production volume includes:
operating the instance of the virtual backup appliance to create, as at least some of the backups, local snapshots of the production volume within the data storage equipment.

15. Data storage equipment as in claim 14 wherein the data storage equipment includes an array of storage devices;
wherein operating the instance of the virtual backup appliance to create the local snapshots includes:
locating a full backup and a series of incremental backups within a set of files stored within the array of storage devices; and
wherein the method further comprises:
replicating the full backup and the series of incremental backups from the data storage equipment to a remote data storage system that is external to the data storage equipment.

16. A computer program product having a non-transitory computer readable medium which stores a set of instructions to provide data storage system services; the set of instructions, when carried out by data storage equipment, causing the data storage equipment to perform a method of:
performing data storage operations on a production volume in response to data storage commands from a set of application servers, the production volume storing application server data utilized by the set of application servers;
running an instance of a virtual backup appliance within the data storage equipment while the data storage operations are performed on the production volume in response to the data storage commands; and
generating backups of the production volume via the instance of the virtual backup appliance running within the data storage equipment;
wherein the set of application servers includes a host computer which is external to the data storage equipment, the host computer providing, as at least some of the data storage commands, block-based host input/output (I/O) requests; and
wherein performing the data storage operations on the production volume includes:
while a backup of the production volume is being generated by the instance of the virtual backup appliance running within the data storage equipment, performing block-based read operations and block-based write operations on the production volume within the data storage equipment in response to the block-based host I/O requests provided by the host computer.

17. A computer program product as in claim 16 wherein generating the backups of the production volume includes:
    operating the instance of the virtual backup appliance to create, as at least some of the backups, local snapshots of the production volume within the data storage equipment.

18. A computer program product as in claim 17, further comprising:
    performing other data storage operations on another production volume in response to other data storage commands from the set of application servers, the other production volume storing other application server data utilized by the set of application servers,
    running another instance of the virtual backup appliance within the data storage equipment while the other data storage operations are performed on the other production volume in response to the other data storage commands, and
    generating other backups of the other production volume via the other instance of the other virtual backup appliance running within the data storage equipment, the other backups of the other production volume being generated in parallel with generating the backups of the production volume via the instance of the virtual backup appliance; and
    wherein the data storage equipment operates a hypervisor which runs the instance of the virtual backup appliance and the other instance of the other virtual backup appliance in parallel to perform backups of production volumes in parallel.

* * * * *